(12) United States Patent
Lerda et al.

(10) Patent No.: US 9,031,209 B2
(45) Date of Patent: *May 12, 2015

(54) DIVIDED CALL HISTORY USER INTERFACE

(71) Applicant: Google Inc., Mountain View, CA (US)

(72) Inventors: Flavio Lerda, London (GB); Hugo Hudson, London (GB); Debashish Chatterjee, London (GB); Simon Tickner, Whitstable (GB); Marcus Alexander Foster, West Malling (GB)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/937,123

(22) Filed: Jul. 8, 2013

(65) Prior Publication Data

US 2013/0295887 A1 Nov. 7, 2013

Related U.S. Application Data

(63) Continuation of application No. 13/615,006, filed on Sep. 13, 2012, now Pat. No. 8,483,366, which is a continuation of application No. 13/352,128, filed on Jan. 17, 2012, now Pat. No. 8,300,777.

(60) Provisional application No. 61/538,905, filed on Sep. 25, 2011.

(51) Int. Cl.
*H04W 4/12* (2009.01)
*H04M 1/56* (2006.01)
*H04M 1/57* (2006.01)
(Continued)

(52) U.S. Cl.
CPC *H04W 4/12* (2013.01); *H04M 1/56* (2013.01);
*H04M 1/57* (2013.01); *H04M 1/72519* (2013.01); *H04M 3/533* (2013.01); *H04M 2203/551* (2013.01); *H04M 2250/60* (2013.01)

(58) Field of Classification Search
CPC ........... H04N 13/583; H04M 2203/00; H04M 3/5315
USPC .................... 370/232, 352; 379/88.11, 93.01, 379/207.15, 142.11; 455/412.2, 414.1, 418, 455/411, 412.1, 415, 569.2; 703/22; 717/140, 158

See application file for complete search history.

(56) References Cited

U.S. PATENT DOCUMENTS 5,978,586 A * 11/1999 Baisley et al. ................ 717/158
6,018,571 A 1/2000 Langlois et al.
(Continued)

FOREIGN PATENT DOCUMENTS

WO 2007131316 A1 11/2007

OTHER PUBLICATIONS

International Preliminary Report on Patentability of International application No. PCT/US2012/055207, mailed Apr. 3, 2014, 5 pp.
(Continued)

*Primary Examiner* — Gerald Gauthier
(74) *Attorney, Agent, or Firm* — Shumaker & Sieffert, P.A.

(57) ABSTRACT

A computing device displays a call history graphical user interface (GUI). The call history GUI includes a new list and an old list. The new list may include new missed call elements and missed call elements associated with new unopened voicemails. The old list may include other call history GUI elements, such as old missed call elements and missed call elements associated with opened voicemails.

20 Claims, 4 Drawing Sheets

(51) Int. Cl.
*H04M 1/725* (2006.01)
*H04M 3/533* (2006.01)

(56) References Cited

U.S. PATENT DOCUMENTS

| | | | |
|---|---|---|---|
| 6,106,574 A * | 8/2000 | Baisley et al. | 717/140 |
| 6,215,860 B1 | 4/2001 | Johanson et al. | |
| 6,434,224 B1 | 8/2002 | Nagashima et al. | |
| 6,519,479 B1 | 2/2003 | Garudadri et al. | |
| 6,560,620 B1 | 5/2003 | Ching | |
| 6,816,880 B1 | 11/2004 | Strandberg et al. | |
| 6,961,308 B2 * | 11/2005 | Suzuki | 370/232 |
| 7,007,239 B1 | 2/2006 | Hawkins et al. | |
| 7,233,229 B2 | 6/2007 | Stroupe et al. | |
| 7,369,651 B2 | 5/2008 | Brandt et al. | |
| 7,450,970 B2 | 11/2008 | Jung | |
| 7,479,949 B2 | 1/2009 | Jobs et al. | |
| 7,636,348 B2 * | 12/2009 | Bettis et al. | 370/352 |
| 7,649,458 B2 | 1/2010 | Mrazovich | |
| 7,664,485 B2 | 2/2010 | Twerdahl et al. | |
| 7,743,188 B2 | 6/2010 | Haitani et al. | |
| 7,844,906 B2 | 11/2010 | Berger | |
| 7,865,180 B2 | 1/2011 | Davis et al. | |
| 7,877,697 B2 | 1/2011 | Canfield et al. | |
| 7,979,091 B2 | 7/2011 | Christensen et al. | |
| 8,077,838 B2 | 12/2011 | Patel et al. | |
| 8,103,970 B1 | 1/2012 | Allen et al. | |
| 8,131,848 B1 | 3/2012 | Denise | |
| 8,160,651 B2 | 4/2012 | De Bast | |
| 8,175,656 B2 | 5/2012 | Beith | |
| 8,300,777 B1 * | 10/2012 | Lerda et al. | 379/88.11 |
| 8,320,547 B2 * | 11/2012 | Cho et al. | 379/207.15 |
| 8,369,903 B2 * | 2/2013 | Saitoh et al. | 455/569.2 |
| 8,412,174 B2 * | 4/2013 | Khosravi | 455/418 |
| 8,483,366 B2 * | 7/2013 | Lerda et al. | 379/88.11 |
| 8,660,546 B2 * | 2/2014 | Hayashi et al. | 455/418 |
| 8,767,929 B2 * | 7/2014 | Othmer | 379/142.11 |
| 8,805,347 B2 * | 8/2014 | Lemke et al. | 455/415 |
| 2004/0181387 A1 | 9/2004 | Petersen | 703/22 |
| 2004/0268265 A1 | 12/2004 | Berger | |
| 2006/0025112 A1 * | 2/2006 | Hamanaga et al. | 455/412.1 |
| 2006/0227956 A1 | 10/2006 | Pearson | |
| 2007/0105545 A1 | 5/2007 | Czeremuga et al. | |
| 2007/0243858 A1 | 10/2007 | Marathe et al. | |
| 2007/0280457 A1 | 12/2007 | Aberethy et al. | |
| 2008/0045186 A1 | 2/2008 | Black et al. | |
| 2008/0139225 A1 | 6/2008 | Hsieh et al. | |
| 2008/0180408 A1 | 7/2008 | Forstall et al. | |
| 2008/0205608 A1 * | 8/2008 | Tal et al. | 379/93.01 |
| 2008/0242356 A1 | 10/2008 | Marui et al. | |
| 2008/0266205 A1 | 10/2008 | Moehring | |
| 2009/0075631 A1 | 3/2009 | Lyle et al. | |
| 2009/0119100 A1 | 5/2009 | Akella et al. | |
| 2009/0163178 A1 | 6/2009 | Kim | |
| 2009/0186597 A1 | 7/2009 | Lin et al. | |
| 2009/0203402 A1 | 8/2009 | Aftab et al. | |
| 2009/0244023 A1 | 10/2009 | Kim et al. | |
| 2009/0298444 A1 | 12/2009 | Shigeta | |
| 2009/0305683 A1 | 12/2009 | Gupta et al. | |
| 2009/0325547 A1 * | 12/2009 | Nath et al. | 455/414.1 |
| 2010/0031180 A1 | 2/2010 | Shin et al. | |
| 2010/0062810 A1 | 3/2010 | Griffin | |
| 2010/0087230 A1 | 4/2010 | Peh et al. | |
| 2010/0159994 A1 | 6/2010 | Stallings et al. | |
| 2010/0159995 A1 | 6/2010 | Stallings et al. | |
| 2010/0184419 A1 | 7/2010 | Othmer | |
| 2010/0211917 A1 | 8/2010 | Tsuei | |
| 2010/0262928 A1 | 10/2010 | Abbott | |
| 2010/0279662 A1 | 11/2010 | Kuusinen et al. | |
| 2010/0293502 A1 | 11/2010 | Kang et al. | |
| 2011/0205435 A1 | 8/2011 | Lee et al. | |
| 2011/0296349 A1 | 12/2011 | Todd et al. | |
| 2011/0307836 A1 | 12/2011 | Cho et al. | |
| 2012/0015638 A1 | 1/2012 | Bocking et al. | |
| 2012/0046046 A1 | 2/2012 | Momiyama et al. | |
| 2012/0064865 A1 | 3/2012 | Choi et al. | |
| 2012/0083260 A1 | 4/2012 | Arriola et al. | |
| 2012/0117499 A1 | 5/2012 | Mori et al. | |
| 2012/0218192 A1 | 8/2012 | Lazaridis et al. | |
| 2012/0329445 A1 | 12/2012 | Elliott | |
| 2013/0078960 A1 * | 3/2013 | Lerda et al. | 455/412.2 |
| 2013/0295887 A1 * | 11/2013 | Lerda et al. | 455/412.2 |

OTHER PUBLICATIONS

Notice of Allowance from U.S. Appl. No. 13/352,128, dated Jun. 14, 2012, 11 pp.
Response to Notice of Allowance dated Jun. 14, 2012, from U.S. Appl. No. 13/352,128, filed Sep. 7, 2012, 8 pp.
Non-Final Office Action from U.S. Appl. No. 13/615,006, dated Nov. 19, 2012, 10 pp.
Response to Non-Final Office Action dated Nov. 19, 2012, from U.S. Appl. No. 13/615,006, filed Feb. 19, 2013, 9 pp.
Notice of Allowance from U.S. Appl. No. 13/615,006, dated Mar. 13, 2013, 8 pp.
International Search Report and Written Opinion of international application No. PCT/US2012/055207, dated Apr. 12, 2013, 9 pp.

* cited by examiner

DIVIDED CALL HISTORY USER INTERFACE

This application is a continuation of U.S. patent application Ser. No. 13/615,006, filed Sep. 13, 2012, which is a continuation of U.S. patent application Ser. No. 13/352,128, filed Jan. 17, 2012, which claims the benefit of U.S. Provisional Application No. 61/538,905, filed Sep. 25, 2011, the entire contents of each are hereby incorporated by reference.

BACKGROUND

Typically, mobile telephony devices have a call history user interface and a separate voicemail user interface. The call history user interface includes a list of elements that identify incoming calls, outgoing calls, and missed calls. The voicemail user interface includes a list of elements that identify voicemails received at a voicemail account of a user.

The call history user interface and the voicemail user interface are typically separated because if the two lists were combined, voicemail elements may be pushed so far down on the merged list that the user would not see the voicemail elements and consequently may not review the voicemail elements. It may be more important for users to be able to review voicemail elements than incoming, outgoing, or missed call elements. At the same time, users logically associate voicemails with missed calls. Thus, it may be non-intuitive to separate missed call elements from the voicemails associated with the missed calls.

SUMMARY

This disclosure describes a call history graphical user interface (GUI) displayed on a display device. The call history GUI concurrently displays a new list and an old list. GUI elements in the call history GUI are divided among the new list and the old list. The GUI elements include missed call elements. Each of the missed call elements corresponds to one or more missed calls. Furthermore, if a missed call corresponds to a voicemail, the missed call element that corresponds to the missed call indicates the existence of the voicemail. The new list includes GUI elements that correspond to new missed calls and to missed calls associated with unopened voicemails. The new missed calls are calls occurring after a most recent previous time that the display device displayed the call history GUI. The old list includes GUI elements that correspond to old missed calls and to opened voicemails. The old missed calls are calls occurring before the most recent previous time that the display device displayed the call history GUI. By presenting the new list and the old list in the same GUI, the GUI may group together missed call elements with corresponding voicemails while at the same time prominently showing the user items that are likely to require the user's attention.

In one example, this disclosure describes a method comprising determining, by a computing device, that a voicemail account has received a voicemail, the voicemail account being associated with a user. The method also comprises determining, by the computing device, whether the voicemail corresponds to a given missed call in a plurality of missed calls to the user. In addition, the method comprises displaying a user interface on a display device. The user interface comprises a plurality of GUI elements. The GUI elements include a plurality of missed call elements that correspond to the missed calls. The missed call elements include a given missed call element that corresponds to the given missed call. The GUI elements are divided among a new list and an old list. The new list includes ones of the GUI elements that correspond to new missed calls and missed calls associated with unopened voicemails. The new missed calls are ones of the missed calls occurring after a most recent previous time that the computing device displayed the user interface. The old list including ones of the GUI elements that correspond to old missed calls. The old missed calls are ones of the missed calls occurring before the most recent previous time that the computing device displayed the user interface on the display device. After determining that the voicemail corresponds to the given missed call, the given missed call element indicates existence of the voicemail.

In another example, this disclosure describes a computing device comprising a storage system that stores instructions. The computing device also comprises a processing system coupled to the storage system. The processing system is configured to read the instructions from the storage system and execute the instructions. Execution of the instructions causes the computing device to determine that a voicemail account has received a voicemail, the voicemail account being associated with a user. Execution of the instructions also causes the computing device to determine whether the voicemail corresponds to a given missed call in a plurality of missed calls to the user. In addition, execution of the instructions causes the computing device to display a user interface on a display device. The user interface comprises a plurality of GUI elements. The GUI elements include a plurality of missed call elements that correspond to the missed calls. The missed call elements include a given missed call element that corresponds to the given missed call. The GUI elements are divided among a new list and an old list. The new list includes ones of the GUI elements that correspond to new missed calls and missed calls associated with unopened voicemails. The new missed calls are ones of the missed calls occurring after a most recent previous time that the computing device displayed the user interface. The old list including ones of the GUI elements that correspond to old missed calls. The old missed calls are ones of the missed calls occurring before the most recent previous time that the computing device displayed the user interface on the display device. After determining that the voicemail corresponds to the given missed call, the given missed call element indicates existence of the voicemail.

In another example, this disclosure describes a computer storage medium that stores instructions for causing a processing system of a computing device to perform operations comprising determining that a voicemail account has received a voicemail, the voicemail account being associated with a user. The operations also include determining whether the voicemail corresponds to a given missed call in a plurality of missed calls to the user. In addition, the operations include displaying a user interface on a display device. The user interface comprises a plurality of GUI elements. The GUI elements include a plurality of missed call elements that correspond to the missed calls. The missed call elements include a given missed call element that corresponds to the given missed call. The GUI elements are divided among a new list and an old list. The new list includes ones of the GUI elements that correspond to new missed calls and missed calls associated with unopened voicemails. The new missed calls are ones of the missed calls occurring after a most recent previous time that the computing device displayed the user interface. The old list including ones of the GUI elements that correspond to old missed calls. The old missed calls are ones of the missed calls occurring before the most recent previous time that the computing device displayed the user interface on the display device. After determining that the voicemail corresponds to the given missed call, the given missed call element indicates existence of the voicemail.

The details of one or more embodiments are set forth in the accompanying drawings and the description below. Other features, objects, and advantages will be apparent from the description and drawings, and from the claims.

DETAILED DESCRIPTION

Figure 1:
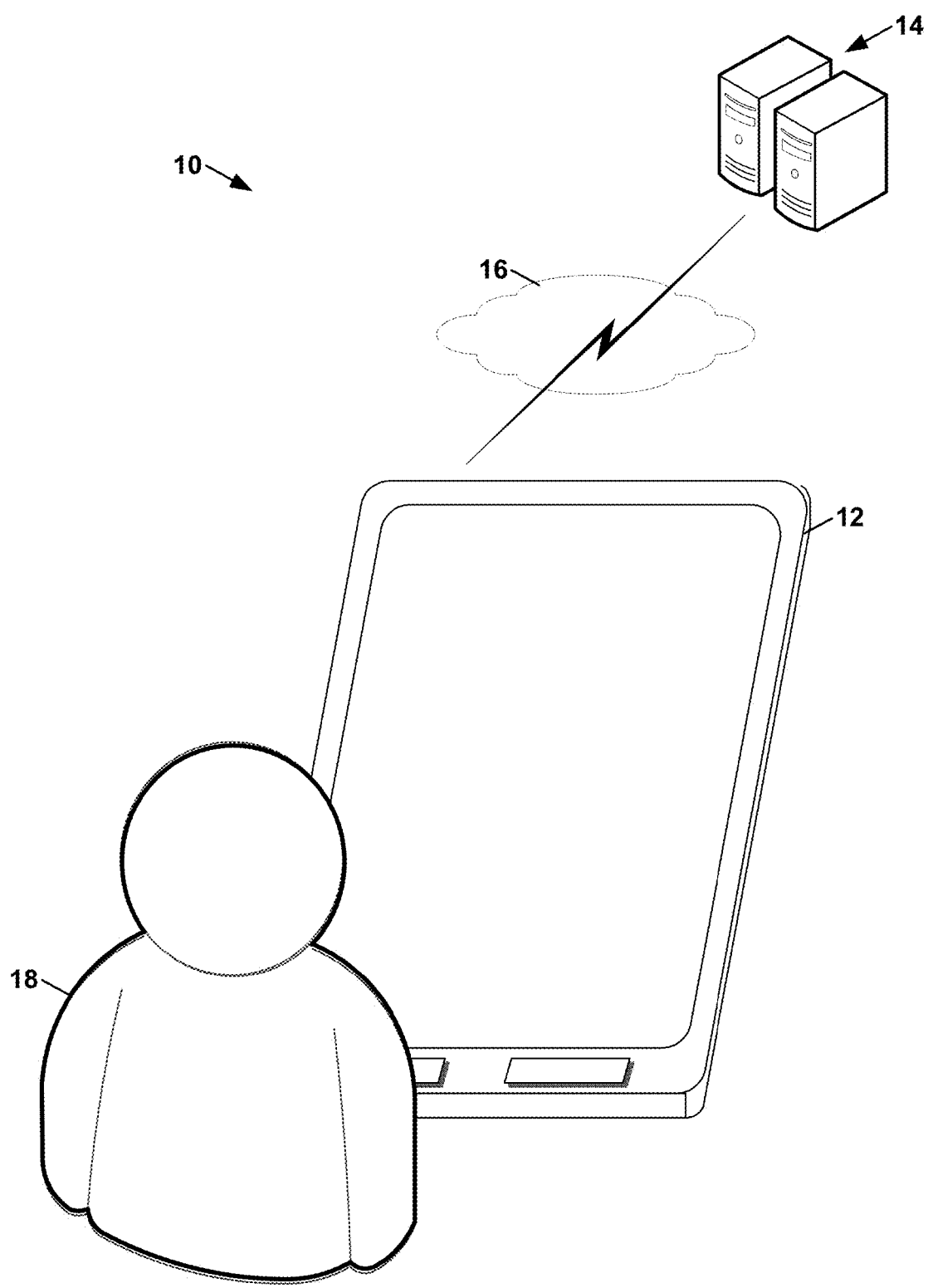
FIG. 1 is a block diagram illustrating an example communication system.

The attached drawings illustrate examples. Elements indicated by reference numbers in the attached drawings correspond to elements indicated by like reference numbers in the following description. In the attached drawings, stacked elements indicate the presence of one or more similar elements. Alphabetical suffixes on reference numbers for similar elements are not intended to indicate the presence of particular numbers of the elements. In this disclosure, elements having names that start with ordinal words (e.g., "first," "second," "third," and so) do not necessarily imply that the elements have a particular order. Rather, such ordinal words may merely be used to refer to different elements of the same or similar kind FIG. 1 is a block diagram illustrating an example communication system 10. Communication system 10 includes a computing device 12, a voicemail system 14, and a network 16. A user 18 uses computing device 12. Although the example of FIG. 1 shows computing device 12 as a tablet computer, computing device 12 may include various types of computing devices. For example, computing device 12 may include a mobile telephone, a tablet computer, a laptop computer, a netbook computer, a desktop computer, an in-car computer, a computing device integrated into an appliance, a television, a television set-top box, or another type of computing device. As used in this disclosure, a computing device may be a physical device that processes information.

Voicemail system 14 comprises one or more computing devices. Although the example of FIG. 1 shows voicemail system 14 as a group of standalone server devices, voicemail system 14 may be implemented using one or more other types of computing devices. For example, voicemail system 14 may be implemented using one or more blade server devices, mainframe computers, desktop computers, or other types of computing devices.

Network 16 facilitates communication between computing device 12 and voicemail system 14. In various examples, network 16 may be implemented in various ways. For example, network 16 may comprise a plurality of intermediate network devices and communication links. Example intermediate network devices include routers, switches, hubs, firewall devices, wireless access points, bridges, gateways, and other types of computing devices. Example types of communication links include wired and wireless communication links. In some examples, network 16 includes the Internet, a public-switched telephone network, and/or another type of communication network.

User 18 may use computing device 12 to engage in voice telephony sessions with other users. For instance, user 18 may use computing device 12 to initiate voice telephony sessions with other users. In other words, user 18 may use computing device 12 to "call" other users. In addition, computing device 12 may receive invitations from other users. The invitations invite user 18 to join voice telephony sessions with the other users. In other words, computing device 12 receives "calls" to user 18.

For various reasons, user 18 may not accept an invitation to join a voice telephony session. That is, user 18 may not answer a call received by computing device 12. When user 18 does not answer a call received by computing device 12, such a call may be referred to as a "missed call." When user 18 does not answer a call received by computing device 12, the call may be handled by voicemail system 14. When the call is handled by voicemail system 14, the caller may be prompted to record a voicemail for user 18. A voicemail may comprise an audio and/or video message recorded by one person to be played back by another user. If the caller records the voicemail, the voicemail corresponds to the call. As used in this disclosure, a caller is a person who invited another user to join a call. In some instances, a person may record a voicemail for user 18 or send a voicemail to user 18 without first calling user 18.

Voicemail system 14 hosts a voicemail account associated with user 18. The voicemail account stores voicemails for user 18. Computing device 12 may communicate over network 16 to determine that the voicemail account stores voicemails for the user. Furthermore, computing device 12 may communicate over network 16 to retrieve voicemails for playback to user 18. Computing device 12 and voicemail system 14 may communicate over network 16 by sending radio and/or electronic signals to one another over network 16.

As described in detail below, computing device 12 displays a call history graphical user interface (GUI) on a display device. The call history GUI concurrently displays a new list and an old list. GUI elements of the call history GUI are divided among the new list and the old list. In other words, the new list and the old list contain different subsets of the GUI elements. The GUI elements include missed call elements. Each of the missed call elements corresponds to one or more missed calls. Furthermore, if a missed call corresponds to a voicemail, the missed call element corresponding to the missed call indicates the existence of the voicemail. The new list includes GUI elements that correspond to new missed calls and missed call elements associated with unopened voicemails. The new missed calls are missed calls occurring after a most recent previous time that the display device displayed the call history GUI. The old list includes GUI elements that correspond to old missed calls and to opened voicemails. The old missed calls are missed calls occurring before the most recent previous time that computing device 12 displayed the call history GUI on the display device. In other words, new missed calls are calls for which a corresponding missed call element is being displayed for the first time and old missed calls are calls for which a corresponding missed call element has previously been displayed at least one time.

In various examples, user 18 may open a voicemail in various ways. For example, opening a voicemail may include playing back the voicemail. In other examples, opening a voicemail may include displaying summary information that describes the voicemail, such as a transcript.

Figure 2:
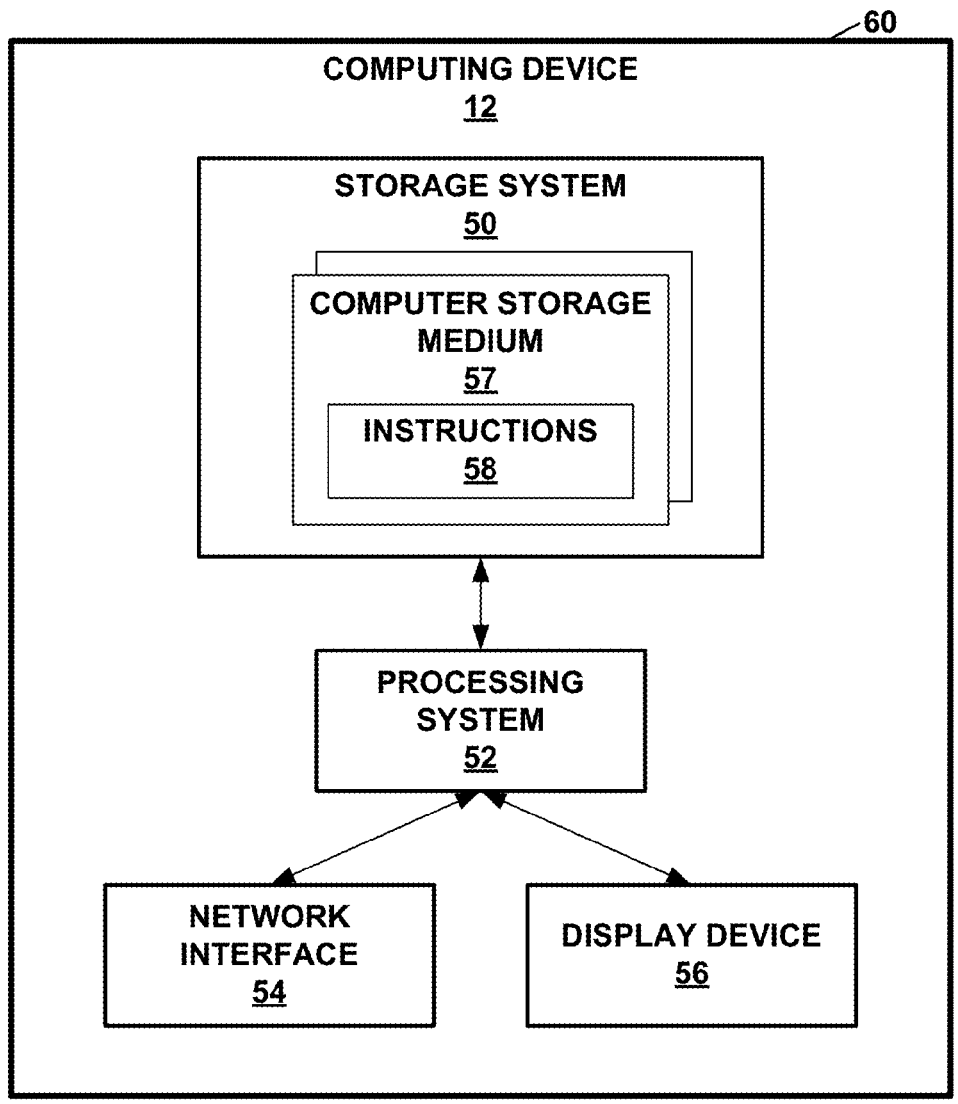
FIG. 2 is a conceptual block diagram that illustrates an example configuration of a computing device.

FIG. 2 is a conceptual block diagram that illustrates an example configuration of computing device 12. As illustrated in the example of FIG. 2, computing device 12 comprises a storage system 50, a processing system 52, a network interface 54, and a display device 56. Readers will understand that computing device 12 may include additional components.

Storage system 50 comprises one or more computer storage media 57 that store instructions 58. As used in this disclosure, a computer-readable medium is a medium from which a computer can read data. The term computer-readable media can refer to computer storage media and communications media. Computer storage media 57 include physical devices that store data for subsequent retrieval. Computer storage media 57 are not transitory. For instance, computer storage media 57 do not exclusively comprise propagated signals. Computer storage media 57 include volatile storage media and non-volatile storage media. Example types of computer storage media 57 include random-access memory (RAM) units, read-only memory (ROM) devices, solid state memory devices, optical discs (e.g., compact discs, DVDs, BluRay discs, etc.), magnetic disk drives, magnetic tape drives, and other types of devices that store data for subsequent retrieval. Communication media include media over which one device can communicate data to another device. Example types of communication media include communication networks, communications cables, wireless communication links, communication buses, and other media over which one device is able to communicate data to another device. Network interface 54 enables computing device 12 to communicate with voicemail system 14 over network 16.

Processing system 52 is coupled to storage system 50 such that processing system 52 is able to read instructions 58 from storage system 50 and execute instructions 58. Processing system 52 comprises one or more processing units. The processing units comprise physical devices that execute instructions 58. The processing units can comprise various types of physical devices that execute instructions 58. For example, one or more of the processing units can comprise a microprocessor, a processing core within a microprocessor, a digital signal processor, a graphics processing unit, a general-purpose graphics processing unit, or another type of physical device that capable of execution instructions 58.

Execution of instructions 58 by processing system 52 may cause computing device 12 to perform various operations, such as those ascribed in this document to computing device 12 and components of computing device 12. For example, execution of instructions 58 by processing system 52 may cause computing device 12 to display and update the call history GUI in accordance with the techniques of this disclosure.

Display device 56 displays graphical data, such as GUIs. In some examples, display device 56 may be a touchscreen that enables computing device 12 to receive input data that indicate inputs from user 18. Although not illustrated in the example of FIG. 2, computing device 12 may include or be communicatively coupled to one or more other types of input devices, such as keypads, keyboards, microphones, cameras, accelerometers, mice, trackballs, and other types of devices that receive input from users.

Display device 56 may be physically coupled to computing device 12. For instance, in the example of FIG. 2, display device 56 is shown as being within a housing 60 of computing device 12. In other examples, display device 56 may be outside housing 60. In some examples, display device 56 may be entirely separate from computing device. In such instances, computing device 12 may display GUIs and other graphical data on display device 56 by communicating with one or more other computing devices. In such examples, computing device 12 may communicate with the other computing devices over a network, such as network 16. For instance, in such examples, computing device 12 may display the call history GUI on display device 56 at least in part by generating and sending hypertext markup language (HTML) data to a computing device that is physically coupled to display device 56. In such an instance, the other computing device may render the HTML data to display the call history GUI on display device 56.

Figure 3:
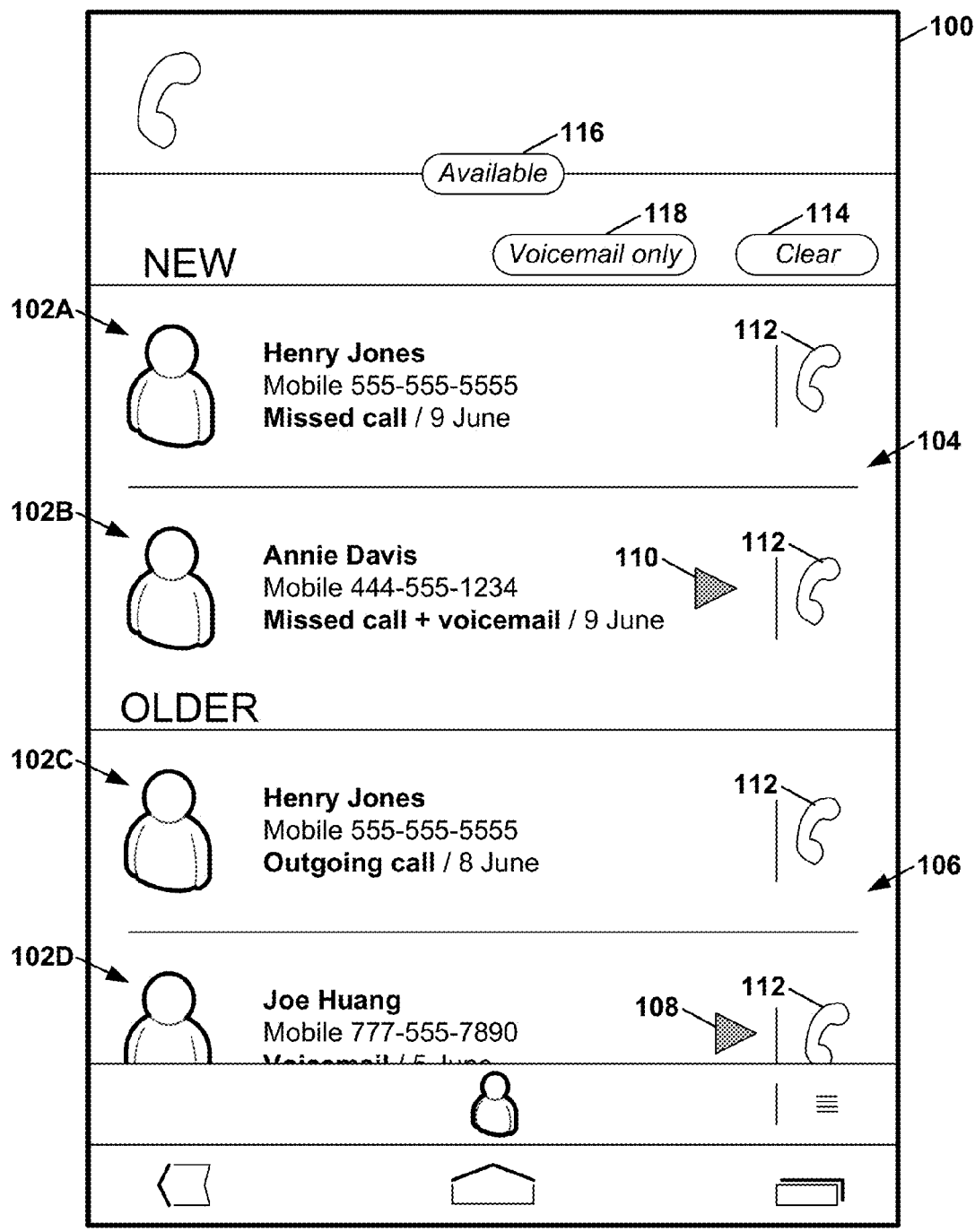
FIG. 3 is a conceptual diagram of a call history graphical user interface (GUI).

FIG. 3 is a conceptual diagram of an example call history GUI 100. Call history GUI 100 includes GUI elements 102A-102D (collectively, "GUI elements 102"). Call history GUI 100 may include GUI elements in addition to GUI elements 102. However, due to size constrains on display device 56, display device 56 may not be able to display all GUI elements of call history GUI 100 concurrently. User 18 may view the additional GUI elements of call history GUI 100 by, for example, scrolling call history GUI 100. In some examples, user 18 may scroll call history GUI 100 by making an upward or downward swiping gesture over call history GUI 100.

Each of the GUI elements of call history GUI 100 corresponds to a call, a voicemail, or a call and a voicemail. For instance, the GUI elements of call history GUI 100 may include incoming call elements and outgoing call elements. Each of the incoming call elements corresponds to a call accepted by user 18. Each of the outgoing call elements corresponds to a call initiated by user 18.

In addition, the GUI elements of call history GUI 100 may include missed call elements. Each of the missed call elements corresponds to one or more missed calls. In some examples, if computing device 12 received multiple missed calls from a single caller, call history GUI may only include a single missed call element corresponding to the multiple missed calls. In other examples, if computing device 12 received multiple missed calls from a single caller, call history GUI 100 may include separate missed call elements for each of the missed calls from the single caller.

If a missed call corresponds to a voicemail, the missed call element corresponding to the missed call indicates the existence of the voicemail. In various examples a missed call element can indicate the existence of a voicemail in various ways. In the example of FIG. 3, GUI element 102B is a missed call element whose missed call corresponds to a voicemail. GUI element 102B uses the text "missed call+voicemail" to indicate the existence of the voicemail. In other examples, missed call elements can indicate the existence of voicemails in other ways. For example, a missed call element can include an icon, such as a stylized audio tape or an icon in the form of a playback control, to indicate the existence of a voicemail.

Furthermore, the GUI elements of call history GUI 100 may include voicemail elements. Each of the voicemail elements corresponds to a voicemail that is not associated with a missed call. In the example of FIG. 3, GUI element 102D is a voicemail element.

User 18 may interact with GUI elements 102 in call history GUI 100 to call people associated with GUI elements 102. In the example of FIG. 3, each of GUI elements 102 includes a phone control 112. User 18 may initiate calls to people associated with GUI elements 102 by making tapping gestures on phone controls 112. Different types of people are associated with different types of GUI elements. For instance, the initiator of an incoming call may be the person associated with an incoming call element. A recipient of an outgoing call may be the person associated with an outgoing call element. The initiator of a missed call may be the person associated with a missed call element. A person who sent a voicemail to user 18 may be the person associated with a voicemail element.

Call history GUI 100 concurrently includes a new list 104 and an old list 106. New list 104 and old list 106 include different subsets of GUI elements 102. In other words, GUI elements 102 are divided among new list 104 and old list 106. In the example of FIG. 3, new list 104 includes GUI elements 102A and 102B. Old list 106 includes GUI elements 102C and 102D. In some examples, the GUI elements within new list 104 are listed in chronological order and the GUI elements within old list 106 are listed in a separate chronological order. Old list 106 may include GUI elements associated with calls or voicemails occurring after one or more calls or voicemails that correspond to GUI elements in new list 104.

The GUI elements in new list 104 may be more likely to be of interest to user 18 than the GUI elements in old list 106. For example, new list 104 may include voicemail elements that correspond to unopened voicemails. Voicemail elements that correspond to unopened voicemails may be of interest to user 18.

Furthermore, the GUI elements in new list 104 may include new non-voicemail missed call elements. The new non-voicemail missed call elements are missed call elements that do not correspond to voicemails and that have not previously been displayed to user 18. In other words, the GUI elements in new list 104 may include missed call elements that correspond to missed calls that are not associated with voicemails and that occur after a most recent previous time that display device 56 displayed call history GUI 100. Such new missed call elements are displayed in new list 104 because it may be likely that user 18 would want to know who has tried to call user 18 since the previous time computing device 12 displayed call history GUI 100 on display device 56.

For example, when display device 56 displays call history GUI 100 for a first time, new list 104 may include one or more missed call elements that do not correspond to voicemails. After display device 56 displays call history GUI 100 for the first time, computing device 12 may display call history GUI 100 for a second time. When display device 56 displays call history GUI 100 for the second time, old list 106 includes the missed call elements that were in new list 104 when computing device 12 displayed call history GUI 100 for the first time. Thus, old list 106 may include missed call elements that correspond to missed calls occurring before the most recent previous time that display device 56 displayed call history GUI 100.

New list 104 may also include missed call elements that correspond to unopened voicemails, even if such missed call elements correspond to missed calls occurring before the most recent previous time that display device 56 displayed call history GUI 100. For example, a given missed call element may correspond to a voicemail. In this example, display device 56 may display the given missed call elements, but user 18 may not want to open the voicemail at that time. However, the voicemail is still likely to be of interest to user 18. Accordingly, computing device 12 may continue to display the given missed call element in new list 104. In some examples, previously-displayed missed call elements that are in new list 104 because they are associated with unopened voicemails may appear different than new missed call elements that correspond to unopened voicemails. For example, new missed call elements that correspond to unopened voicemails may include a different icon, different text, a different text style, or another feature that distinguishes them from missed call elements that are present in new list 104 because of unopened voicemails.

User 18 may interact with voicemail elements and missed call elements to open corresponding voicemails. For example, user 18 may make a tapping gesture on a portion of the voicemail element or missed call element or a swiping gesture over the voicemail element or missed call element to open the voicemail. In the example of FIG. 3, GUI element 102D is a voicemail element. As illustrated in the example of FIG. 3, GUI element 102D comprises an arrow control 108. User 18 may open the voicemail corresponding to GUI element 102D by making a tapping gesture on arrow control 108. When user 18 interacts with the voicemail element to open the voicemail, computing device 12 may receive input data indicating an input on call history GUI 100 to open the voicemail. Furthermore, in the example of FIG. 3, GUI element 102B is a missed call element that has a corresponding voicemail. User 18 may open the voicemail corresponding to GUI element 102B by making a tapping gesture on arrow control 110.

In response to user 18 opening a voicemail corresponding to a given GUI element in new list 104, computing device 12 may move the given GUI element from new list 104 to old list 106. In other words, computing device 12 removes the given GUI element from new list 104 and adds the given GUI element at a chronologically appropriate place in old list 106. In some examples, computing device 12 moves the given GUI element from new list 104 to old list 106 immediately after user 18 opens the voicemail. In other examples, computing device 12 moves the given GUI element from new list 104 to old list 106 when display device 56 displays call history GUI 100 at a later time.

It may be less likely that a missed call requires the attention of user 18 if user 18 has spoken with the person who initiated the missed call after the missed call occurred. Hence, computing device 12 may determine whether user 18 has used computing device 12 to speak with the initiator of a given missed call after the given missed call occurred. For instance, computing device 12 may determine whether user 18 has initiated a call to the initiator of the given missed call after the given missed call occurred or determine whether user 18 has accepted a call from the initiator of the given missed call after the given missed call occurred. After computing device 12 determines that user 18 has used computing device 12 to speak with the initiator of the given missed call, computing device 12 may display a missed call element corresponding to the given missed call in old list 106 rather than new list 104. In some instances, computing device 12 may display the missed call element corresponding to the given missed call in old list 106 regardless of whether user 18 has opened a voicemail corresponding to the given missed call. In this way, new list 104 does not include a GUI element that is less likely to require the attention of user 18.

Similarly, it may be less likely that an unopened voicemail requires the attention of user 18 if user 18 has spoken with the person who recorded or sent the voicemail after the person recorded or sent the voicemail. Hence, computing device 12 may determine whether user 18 has used computing device 12 to speak with the sender or recorder of a given voicemail after the given voicemail was sent or recorded. After computing device 12 determines that user 18 has spoken with the sender or recorder of the given voicemail after the given voicemail was sent or recorded, computing device 12 may display a voicemail element or a missed call element associated with the given voicemail in old list 106 rather than new list 104, regardless of whether user 18 has opened the given voicemail.

Call history GUI 100 may also include a clear control 114. Computing device 12 may move each GUI element in new list 104 to old list 106 in response to receiving a tapping gesture on clear control 114. Thus, computing device 12 may receive input data indicating an input on call history GUI 100. In response to receiving the input data, computing device 12 may move all of the GUI elements in new list 104 to old list 106.

Furthermore, new list 104 may include a given missed call element or a given voicemail element that corresponds to a voicemail. If user 18 chooses not open the voicemail for an extended period of time, it may become increasingly unlikely that the voicemail requires the attention of user 18. Accordingly, computing device 12 may determine whether the difference between a current time and a time of the voicemail is greater than a given threshold. After computing device 12 determines that the difference between the current time and the time of the voicemail is greater than the given threshold, computing device 12 displays the given missed call element or the given voicemail element in old list 106, regardless of whether the voicemail is opened.

In the example of FIG. 3, computing device 12 displays a status indicator 116 in call history GUI 100. Status indicator 116 indicates whether computing device 12 is able to access the voicemail account associated with user 18. In the example of FIG. 3, status indicator 116 indicates that computing device 12 is able to access the voicemail account. When computing device 12 is unable to access the voicemail account, computing device 12 might not be able to detect whether new voicemails have been received. In some instances, computing device 12 might not be able to retrieve voicemails from voicemail system 14 when computing device 12 is unable to access the voicemail account.

Computing device 12 may be unable to access the voicemail account for various reasons. For example, computing device 12 may be unable to access the voicemail account when computing device 12 is outside a wireless service area or when a network cable is disconnected from computing device 12. In another example, computing device 12 may be unable to access the voicemail account when computing device 12 is roaming and is configured not to access the voicemail account while roaming.

Computing device 12 also displays a filter control 118 in call history GUI 100. User 18 may select filter control 118. When user 18 selects filter control 118, computing device 12 receives input data indicating a filter input on call history GUI 100. In response to receiving the input data, computing device 12 updates call history GUI 100 such that call history GUI 100 only displays GUI elements that correspond to voicemails, e.g., voicemail elements and missed call elements that are associated with voicemails. Thus, when user 18 selects filter control 118, incoming call elements, outgoing call elements, non-voicemail missed call elements are not shown in call history GUI 100. In this way, user 18 may easily review voicemails without reviewing the entire call history.

In some examples, old list 106 may include GUI elements that correspond to GUI elements in new list 104. For example, new list 104 may include a given missed call element. In this example, old list 106 may include a second copy of the given missed call element. In another example, new list 104 may include a given voicemail element that corresponds to a given voicemail. In this example, old list 106 may also include a voicemail element that corresponds to the given voicemail. Thus, old list 106 may represent a complete missed call and voicemail history of computing device 12 over a given period of time.

Although not illustrated in the example of FIG. 3, call history GUI 100 may include a new list collapse control. When computing device 12 receives input data that indicate user input on the new list collapse control, computing device 12 modifies call history GUI 100 such that the GUI elements in new list 104 are replaced by a single element. This element may indicate how many missed call elements and voicemail elements are in new list 104. If computing device 12 subsequently receives input data indicating a user input on this element, computing device 12 may modify call history GUI 100 again to display each of the missed call elements and voicemail elements in new list 104. In some examples, call history GUI 100 includes a similar control for old list 106.

Figure 4:
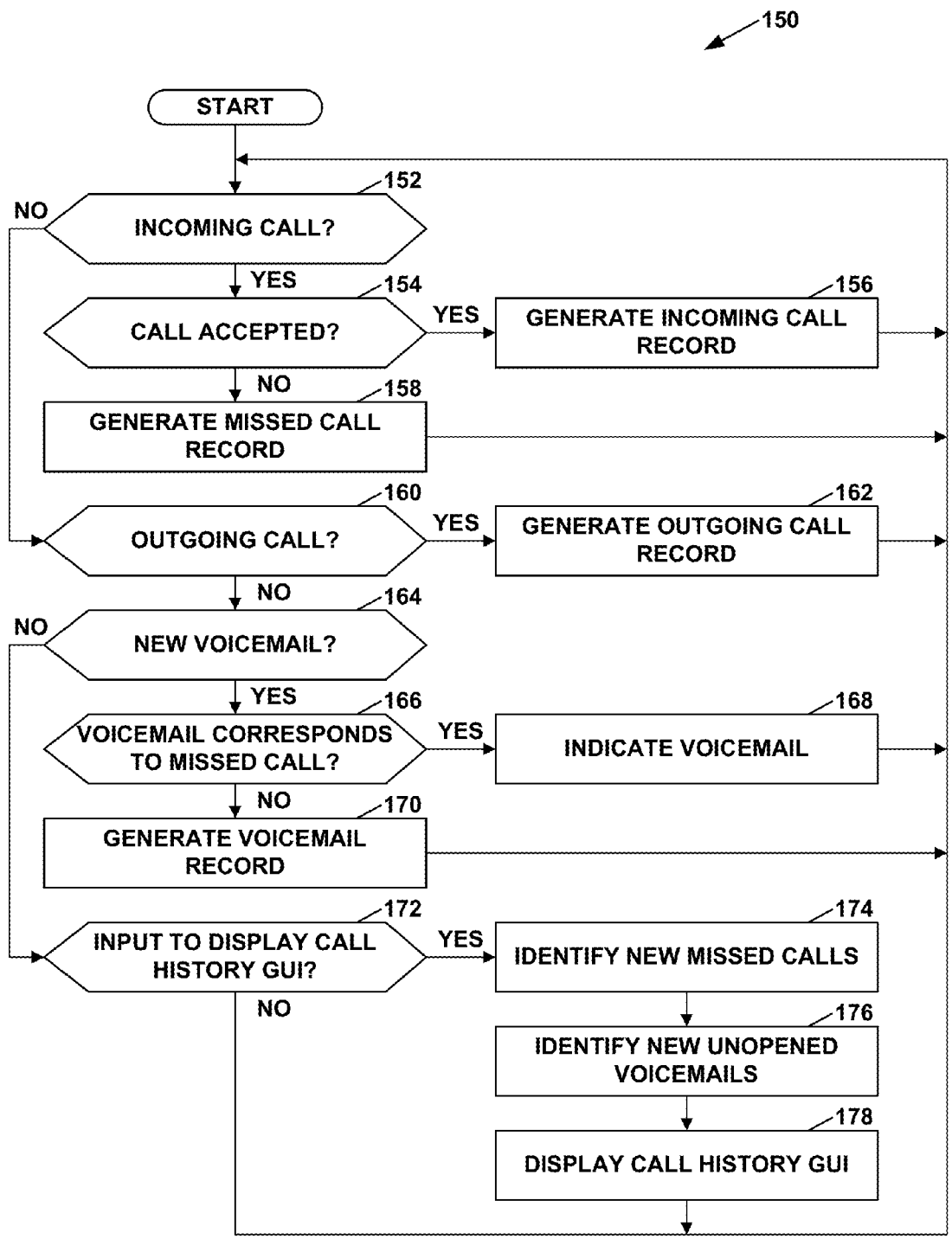
FIG. 4 is a flowchart illustrating an example process performed by the computing device.

FIG. 4 is a flowchart that illustrates an example process 150 performed by computing device 12. Process 150 is a loop that computing device 12 may perform repeatedly during normal operation of computing device 12. Readers will understand that in other examples, computing device 12 may perform different operations. For instance, computing device 12 may perform a process that includes more, fewer, or different steps than process 150 or performs the steps of process 150 in a different order.

After computing device 12 starts performing process 150, computing device 12 determines whether an incoming call has occurred (152). If an incoming call has occurred ("YES" of 152), computing device 12 determines whether user 18 accepted the incoming call (154). If user 18 accepted the incoming call ("YES" of 154), computing device 12 generates an incoming call record (156). The incoming call record includes information about the incoming call. Such information may include a time and date at which computing device 12 received the incoming call, a phone number associated with a caller, a duration of the incoming call, and other information about the incoming call. Computing device 12 may store the incoming call record in storage system 50. After generating the incoming call record, computing device 12 may loop back to the beginning of process 150.

However, if user 18 does not accept the incoming call ("NO" of 154), computing device 12 generates a missed call record (158). The missed call record includes information about the missed call. Such information may include a time and date at which computing device 12 received the missed call, a phone number associated with a caller, and other information about the missed call. Computing device 12 may store the missed call record in storage system 50. After generating the missed call record, computing device 12 may loop back to the beginning of process 150.

If computing device 12 determines that an incoming call has not occurred ("NO" of 152), computing device 12 determines whether an outgoing call has occurred (160). If an outgoing call has occurred ("YES" of 160), computing device 12 generates an outgoing call record (162). The outgoing call record includes information about the outgoing call. Such information may include a time and date at which the outgoing call occurred, a phone number associated with the called party, a duration of the outgoing call, and other information about the outgoing call. Computing device 12 may store the outgoing call record in storage system 50. After generating the outgoing call record, computing device 12 may loop back to the beginning of process 150.

If computing device 12 determines that an outgoing call has not occurred ("NO" of 154), computing device 12 determines whether a voicemail account associated with user 18 has received a new voicemail (164). If the voicemail account has received a new voicemail ("YES" of 164), computing device 12 may determine whether the new voicemail corresponds to a missed call (166). In various examples, computing device 12 may determine whether the new voicemail corresponds to a missed call in various ways. For example, computing device 12 may determine whether the new voicemail corresponds to a missed call at least in part determining whether the voicemail and the missed call are associated with the same phone number and a difference between a time at which the voicemail was recorded or sent and a time of the missed call is less than a given duration, e.g., less than thirty seconds, one minute, etc.

If the new voicemail corresponds to a missed call ("YES" of 166), computing device 12 may update a missed call record for the missed call to indicate that the new voicemail is associated with the missed call (168). After updating the missed call record, computing device 12 may loop back to the beginning of process 150.

On the other hand, if the new voicemail does not correspond to any missed call ("NO" of 166), computing device 12 generates a voicemail record (170). The voicemail record includes information about the new voicemail. Such information may include a time and date at which the new voicemail was recorded or sent, a phone number associated with the new voicemail, a duration of the new voicemail, a text transcript of the new voicemail, and/or other information about the new voicemail. Computing device 12 may store the voicemail record in storage system 50. After generating the voicemail record, computing device 12 may loop back to the beginning of process 150.

If the voicemail account has not received a new voicemail ("NO" of 164), computing device 12 determines whether computing device 12 has received input data indicating an input to view call history GUI 100 (172). If computing device 12 determines that computing device 12 has not received input data indicating an input to view call history GUI 100 ("NO" of 172), computing device 12 may loop back to the beginning of process 150.

If computing device 12 determines that computing device 12 has received input data indicating an input to view call history GUI 100 ("YES" of 172), computing device 12 may use the missed call records to identify new missed calls (174). The new missed calls are missed calls that occurred after a most recent previous time that computing device 12 displayed call history GUI 100. In some examples, the new missed calls may exclude a missed call if user 18 has used computing device 12 to speak with the caller after the missed call occurred.

In addition, computing device 12 may use the voicemail records and missed call records to identify new unopened voicemails (176). To identify the new unopened voicemails, computing device 12 may first identify voicemails that are unopened. Computing device 12 may then determine whether differences between a current time and times of the unopened voicemails are greater than a given threshold. If the difference between the current time and the time of an unopened voicemail is not greater than the given threshold, the unopened voicemail may be a new unopened voicemail. In various examples, the given threshold has various values. For example, the given threshold may be one day, one week, one month, or another period of time. Furthermore, in some examples, computing device 12 may not consider a voicemail to be an unopened voicemail if user 18 used computing device 12 to speak with a person who recorded or sent the voicemail after person recorded or sent the voicemail.

After identifying the new missed calls and the new unopened voicemails, computing device 12 displays call history GUI 100 (178). As discussed above, call history GUI 100 includes GUI elements such as incoming call elements, outgoing call elements, missed call elements, and voicemail elements. Computing device 12 may use the incoming call records to generate the incoming call elements, the outgoing call records to generate the outgoing call elements, the missed call records to generate the missed call records, and the voicemail records to generate the voicemail elements.

Furthermore, as discussed above, a subset of the GUI elements are in new list 104 and a different subset of the GUI elements are in old list 106. When computing device 12 displays call history GUI 100, computing device 12 displays the missed call elements associated with the new missed calls in new list 104. In addition, computing device 12 displays the voicemail elements associated with new voicemails in new list 104. Furthermore, computing device 12 displays the missed call elements associated with new unopened voicemails in new list 104. Computing device 12 may display the remainder of the GUI elements in old list 106.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer-readable medium, such as a computer-readable storage medium, containing instructions. Instructions embedded or encoded in a computer-readable medium, including a computer-readable storage medium, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

Various embodiments of the invention have been described. These and other embodiments are within the scope of the following claims.

What is claimed is:

1. A method comprising:
   determining, by a computing device, that a plurality of missed calls have been received by the computing device, each missed call from the plurality of missed calls being an incoming call for which user input to accept the incoming call was not received;
   determining, by the computing device, that a first subset of the plurality of missed calls is more likely to be of interest to a user of the computing device than a second subset of the plurality of missed calls, wherein a criterion other than a chronological order of the plurality of missed calls is used for determining that the first subset of the plurality of missed calls is more likely to be of interest to the user of the computing device than the second subset of the plurality of missed calls; and outputting, by the computing device, a user interface for display at a display device, wherein the user interface concurrently includes a first region and a second region, the first region being separate and visually distinct from the second region, the first region comprising a first list of graphical user interface (GUI) elements, the second region comprising a second list of GUI elements, wherein the GUI elements of the first list correspond to missed calls in the first subset and the GUI elements of the second list correspond to missed calls in the second subset.

2. The method of claim 1, wherein:
the first subset includes missed calls that occurred after a most recent previous time that the first and second lists were displayed, and
the second subset includes missed calls that occurred before the most recent previous time that the first and second lists were displayed.

3. The method of claim 2, wherein:
if a particular missed call occurred after the most recent previous time that the first and second lists were displayed and if the computing device has not been used in any call with an initiator of the particular missed call after the particular missed call occurred, the first subset includes the particular missed call, and
if the particular missed call occurred before the most recent previous time that the first and second lists were displayed or if the computing device has been used in any call with the initiator of the particular missed call after the particular missed call occurred, the second subset includes the particular missed call.

4. The method of claim 3, further comprising determining, by the computing device, that the computing device has been used in any call with the initiator of the particular missed call if the computing device was used to initiate the call to the initiator of the particular missed call after the particular missed call occurred.

5. The method of claim 3, further comprising determining, by the computing device, that the computing device has been used in any call with the initiator of the particular missed call if the computing device has received user input to accept the call from the initiator of the particular missed call after the particular missed call occurred.

6. The method of claim 2, wherein if a particular missed call occurred before the most recent previous time that the first and second lists were displayed and the particular missed call corresponds to an unopened voicemail, the first subset includes the particular missed call.

7. The method of claim 2, wherein if a particular missed call occurred after the most recent previous time that the first and second lists were displayed and the particular missed call corresponds to an unopened voicemail, the first subset includes the particular missed call.

8. The method of claim 2, wherein if a particular missed call occurred before the most recent previous time that the first and second lists were displayed, the particular missed call corresponds to an unopened voicemail, and a difference between a current time and a time at which the unopened voicemail was sent is less than a given duration, the first subset includes the particular missed call.

9. The method of claim 2, wherein GUI elements in the first list that correspond to the missed calls that occurred after the most recent previous time that the first and second lists were displayed and that correspond to unopened voicemails have a different appearance than GUI elements in the first list that correspond to the missed calls that occurred before the most recent previous time that the first and second lists were displayed and that correspond to unopened voicemails.

10. The method of claim 2, wherein if a particular missed call occurred before the most recent previous time that the first and second lists were displayed, the particular missed call corresponds to an unopened voicemail, and a difference between a current time and a time at which the unopened voicemail was sent is greater than a given duration, the second subset includes the particular missed call.

11. The method of claim 1, further comprising:
receiving, by the computing device, user input to open a voicemail that corresponds to a particular missed call from the plurality of missed calls;
opening, by the computing device, the voicemail responsive to receiving the user input; and
moving, by the computing device, a GUI element that corresponds to the particular missed call from the first list to a chronologically-appropriate place in the second list responsive to receiving the user input.

12. The method of claim 1, wherein outputting the user interface for display comprises:
outputting, by the computing device for display at the display device, the user interface such that the second list includes incoming call elements and outgoing call elements, each of the incoming call elements corresponding to a call for which user input to accept the call was received, each of the outgoing call elements corresponding to a call for which user input to initiate the call was received.

13. The method of claim 1, further comprising, responsive to receiving user input, updating the user interface such that the first list and the second list only include GUI elements that have corresponding voicemails.

14. The method of claim 1, wherein the first list or the second list includes a GUI element that corresponds to more than one missed call.

15. The method of claim 1, wherein the GUI elements in the first list are chronologically ordered and the GUI elements in the second list are chronologically ordered.

16. The method of claim 1, wherein the first list and the second list are independently collapsible within the user interface.

17. A computing device comprising one or more processors configured to:
determine that a plurality of missed calls have been received by the computing device, each missed call from the plurality of missed calls being an incoming call for which user input to accept the incoming call was not received;
determine that a first subset of the plurality of missed calls is more likely to be of interest to a user of the computing device than a second subset of the plurality of missed calls, wherein a criterion other than a chronological order of the plurality of missed calls is used for determining that the first subset of the plurality of missed calls is more likely to be of interest to the user of the computing device than the second subset of the plurality of missed calls; and
output a user interface for display at a display device, wherein the user interface concurrently includes a first region and a second region, the first region being separate and visually-distinct from the second region, the first region comprising a first list of graphical user interface (GUI) elements, the second region comprising a second list of GUI elements, wherein the GUI elements of the first list correspond to missed calls in the first subset and the GUI elements of the second list correspond to missed calls in the second subset.

18. The computing device of claim 17, wherein:
the first subset includes missed calls that occurred after a most recent previous time that the first and second lists were displayed, and
the second subset includes missed calls that occurred before the most recent previous time that the first and second lists were displayed.

19. The computing device of claim 18, wherein if a particular missed call occurred after the most recent previous time that the first and second lists were displayed and the particular missed call corresponds to an unopened voicemail, the first subset includes the particular missed call.

20. A computer-readable storage medium storing instructions that, when executed by one or more processors of a computing device, cause the computing device to:
determine that a plurality of missed calls have been received by the computing device, each missed call from the plurality of missed calls being an incoming call for which user input to accept the incoming call was not received;
determine that a first subset of the plurality of missed calls is more likely to be of interest to a user of the computing device than a second subset of the plurality of missed calls, wherein a criterion other than a chronological order of the plurality of missed calls is used for determining that the first subset of the plurality of missed calls is more likely to be of interest to the user of the computing device than the second subset of the plurality of missed calls; and
output a user interface for display at a display device, wherein the user interface concurrently includes a first region and a second region, the first region being separate and visually-distinct from the second region, the first region comprising a first list of graphical user interface (GUI) elements, the second region comprising a second list of GUI elements, wherein the GUI elements of the first list correspond to missed calls in the first subset and the GUI elements of the second list correspond to missed calls in the second subset.

\* \* \* \* \*